(12) United States Patent
Kim

(10) Patent No.: US 8,220,529 B2
(45) Date of Patent: Jul. 17, 2012

(54) HEAT EXCHANGER OF CONDENSING BOILER FOR HEATING AND HOT-WATER SUPPLY

(75) Inventor: Yong-Bum Kim, Inchon (KR)

(73) Assignee: Kyungdong Navien Co., Ltd., Gyunggi-Do (KR)

( * ) Notice: Subject to any disclaimer, the term of this patent is extended or adjusted under 35 U.S.C. 154(b) by 855 days.

(21) Appl. No.: 12/085,333

(22) PCT Filed: Mar. 14, 2006

(86) PCT No.: PCT/KR2006/000898
§ 371 (c)(1),
(2), (4) Date: May 21, 2008

(87) PCT Pub. No.: WO2007/083862
PCT Pub. Date: Jul. 26, 2007

(65) Prior Publication Data
US 2009/0133861 A1 May 28, 2009

(30) Foreign Application Priority Data
Dec. 14, 2005 (KR) .......................... 10-2005-0123054

(51) Int. Cl.
*F24H 1/10* (2006.01)
(52) U.S. Cl. .................... 165/140; 165/167; 122/235.16
(58) Field of Classification Search .................. 165/140, 165/143, 144
See application file for complete search history.

(56) References Cited

U.S. PATENT DOCUMENTS

| | | | | |
|---|---|---|---|---|
| 1,328,998 A * | 1/1920 | Jones | ............................ | 202/167 |
| 2,663,170 A * | 12/1953 | Gloyer | .......................... | 165/166 |
| 2,858,677 A * | 11/1958 | Stone | .............................. | 62/171 |
| 3,153,446 A * | 10/1964 | Shaw | ............................. | 165/164 |
| 3,566,502 A * | 3/1971 | Pasqualini | ................ | 29/890.07 |
| 4,002,201 A * | 1/1977 | Donaldson | .................... | 165/140 |
| 4,475,587 A * | 10/1984 | Vasiliev et al. | ............... | 165/140 |
| 4,996,950 A * | 3/1991 | Le Mer | ......................... | 122/260 |
| 5,180,004 A * | 1/1993 | Nguyen | ........................ | 165/140 |
| 5,613,553 A * | 3/1997 | Hong | ............................ | 165/140 |

(Continued)

FOREIGN PATENT DOCUMENTS

JP     1-93193     4/1989
(Continued)

OTHER PUBLICATIONS

International Search Report for Application No. PCT/KR2006/000898, dated Jul. 28, 2006.

*Primary Examiner* — Allen Flanigan
(74) *Attorney, Agent, or Firm* — Nelson Mullins Riley & Scarborough LLP; Anthony A. Laurentano

(57) ABSTRACT

Disclosed is a heat exchanger for a condensing boiler supplying both heating water and hot water, which can use a double pipe as a sensible heat exchanger, instead of the use of an indirect heat exchanger. The heat exchanger includes: a sensible heat exchanger; and a latent heat exchanger made by connecting a plurality of unit heat exchangers to define exhaust gas pathway, each unit heat exchanger being manufactured in such a manner that three plates having a convexo-concave shape are stacked on one another to define a heating water pathway and a hot water pathway to be adjacent to each other in order to increase a heat transfer area.

3 Claims, 4 Drawing Sheets

U.S. PATENT DOCUMENTS 5,884,696 A * 3/1999 Loup .............................. 165/140
2002/0185264 A1 * 12/2002 Halt et al. ..................... 165/153

FOREIGN PATENT DOCUMENTS

| JP | 2002-213757 | 7/2002 |
| JP | 2005-164236 | 6/2005 |
| JP | 2005-274043 | 10/2005 |
| JP | 2005-274045 | 10/2005 |
| KR | 1998-045596 | 9/1998 |
| KR | 1999-0039907 | 6/1999 |
| KR | 2000-0008506 | 5/2000 |
| KR | 1020020000703 | 1/2002 |
| KR | 2002-0067301 | 8/2002 |
| KR | 2003-0097212 | 12/2003 |

* cited by examiner

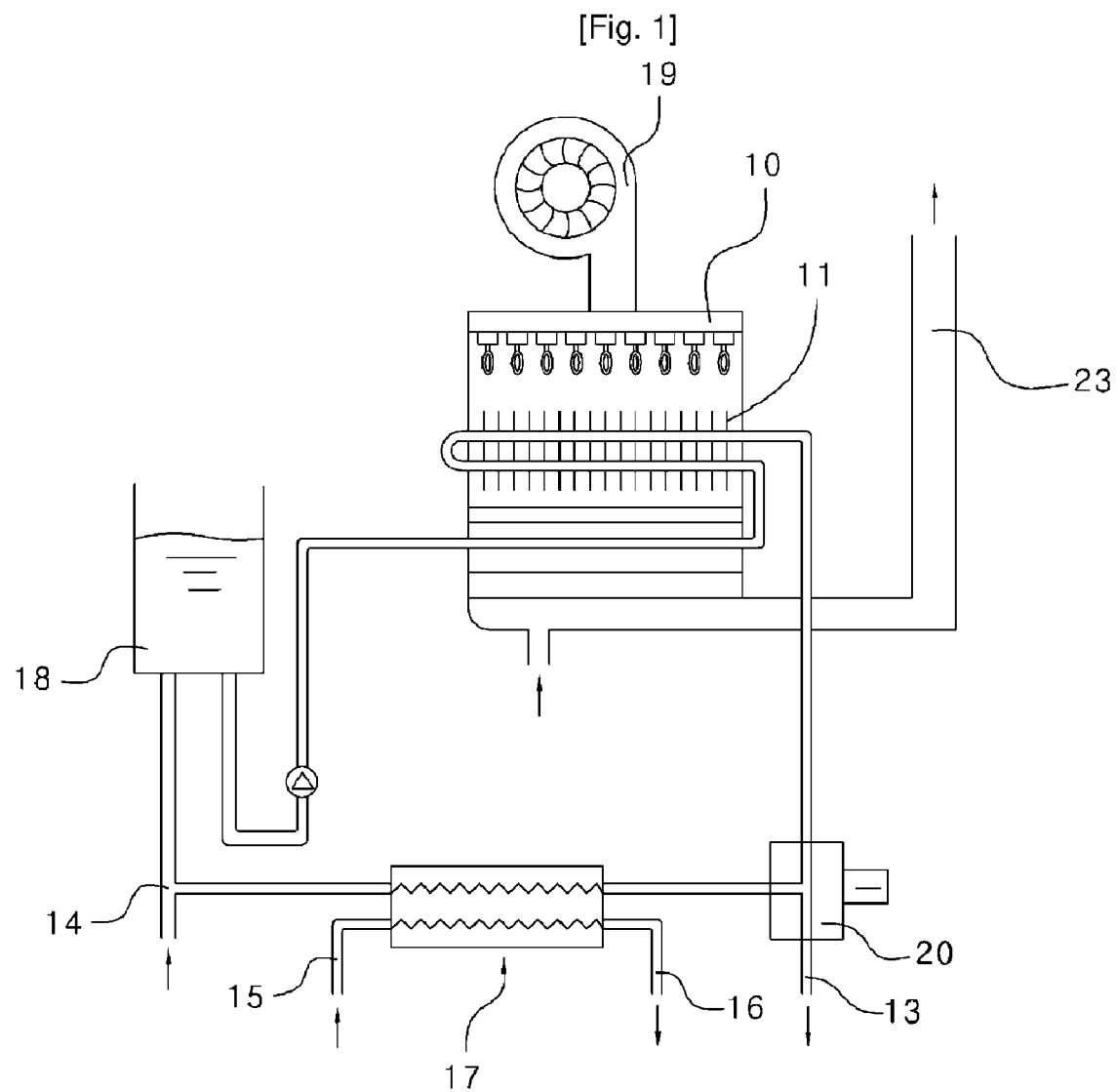
[Fig. 1]

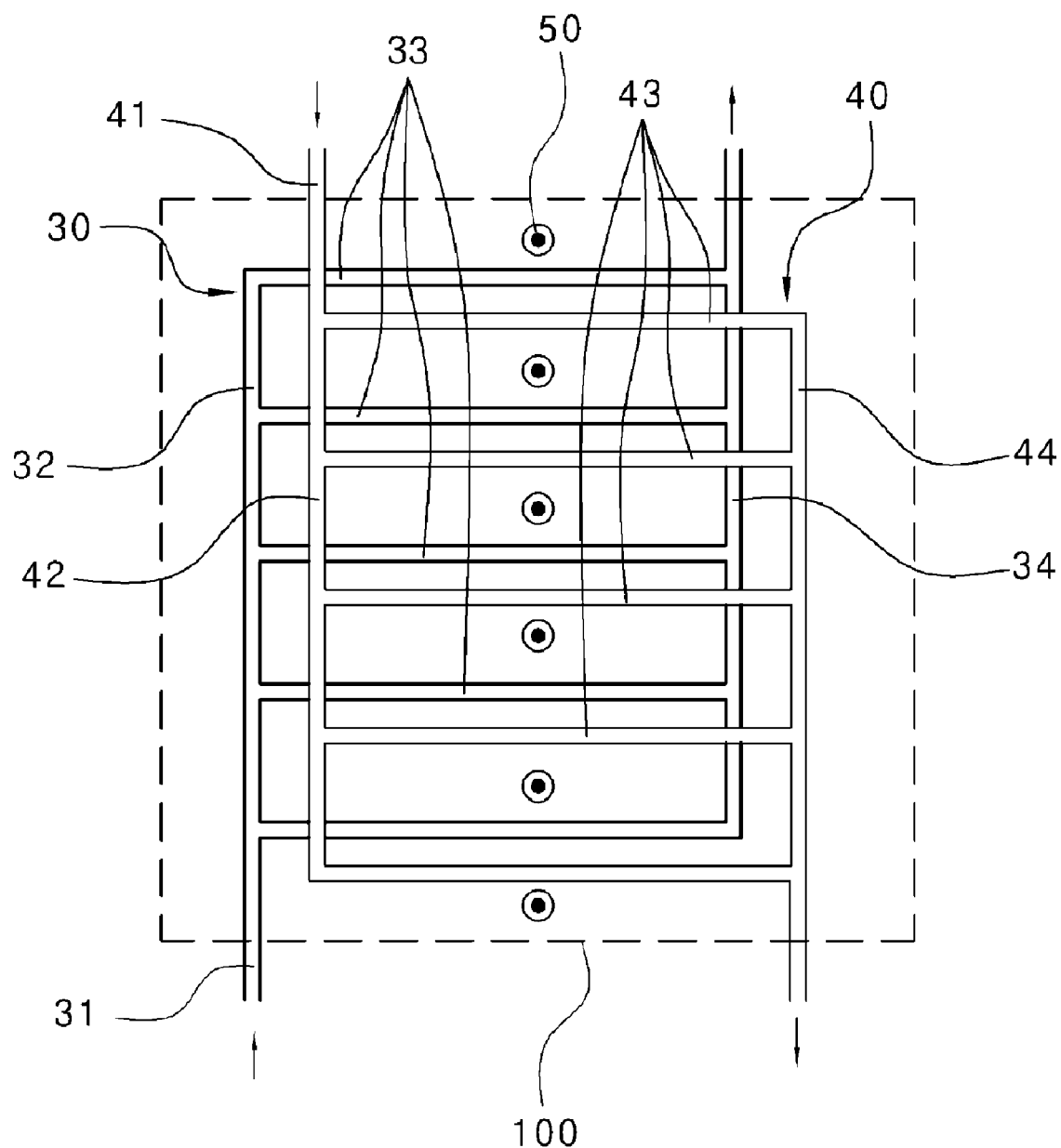
[Fig. 2]

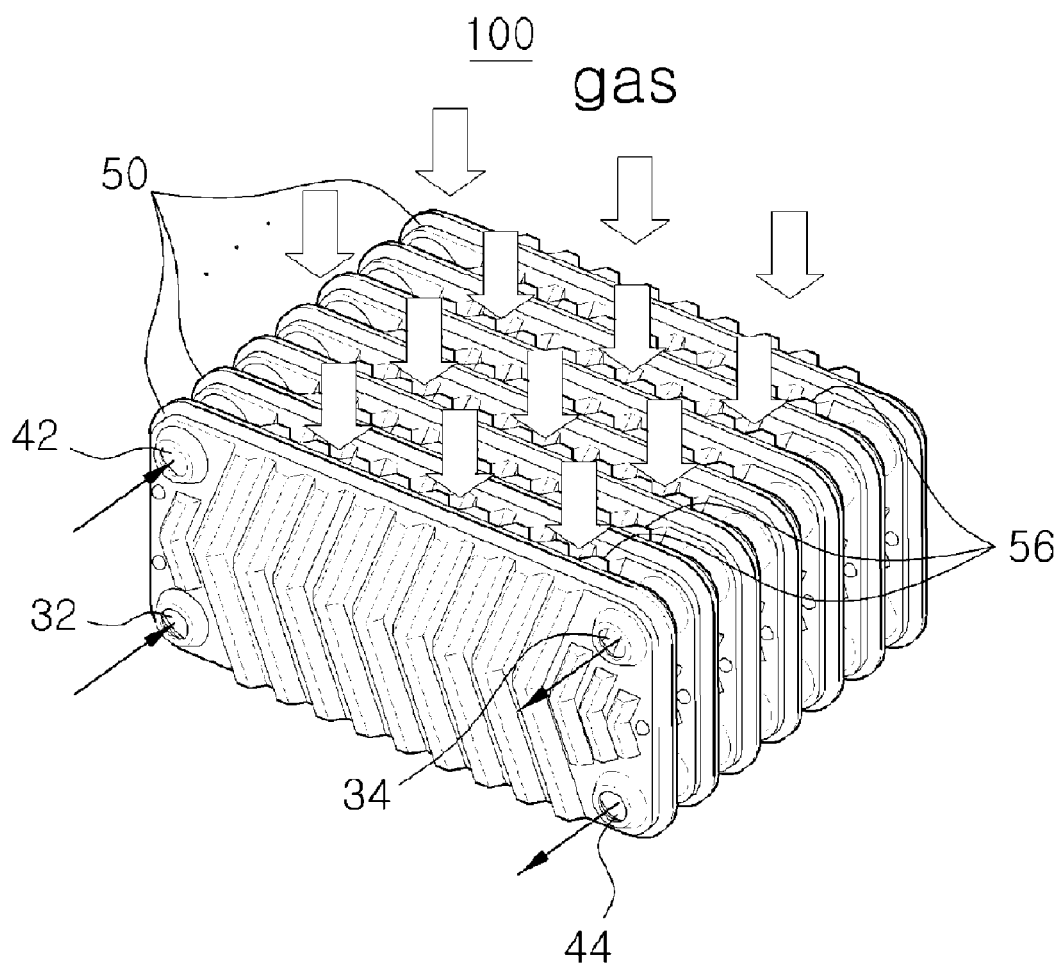
[Fig. 3]
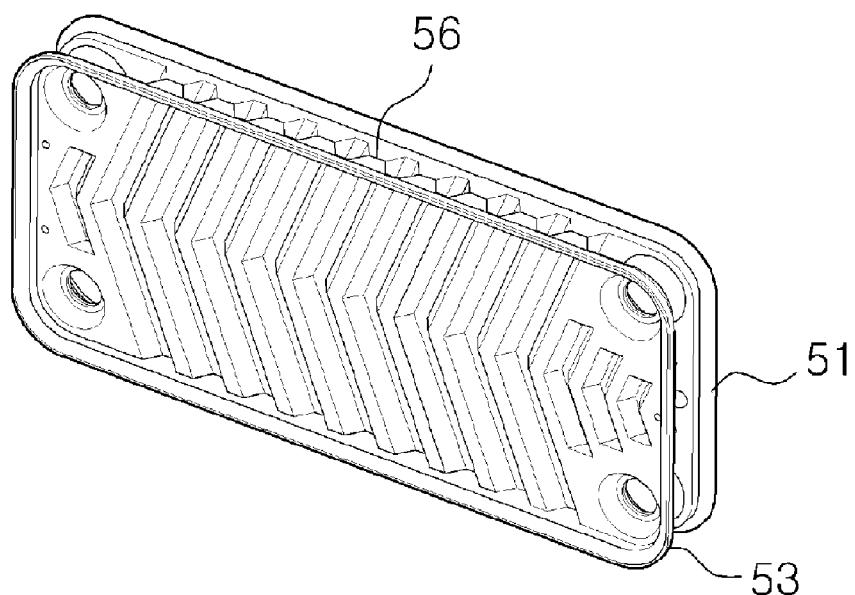
[Fig. 4]

[Fig. 5]
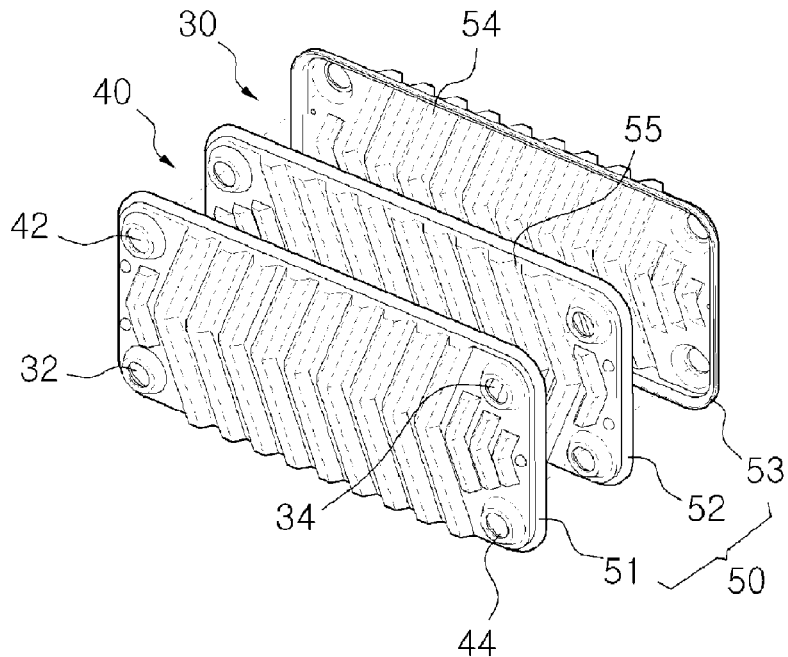
[Fig. 6]
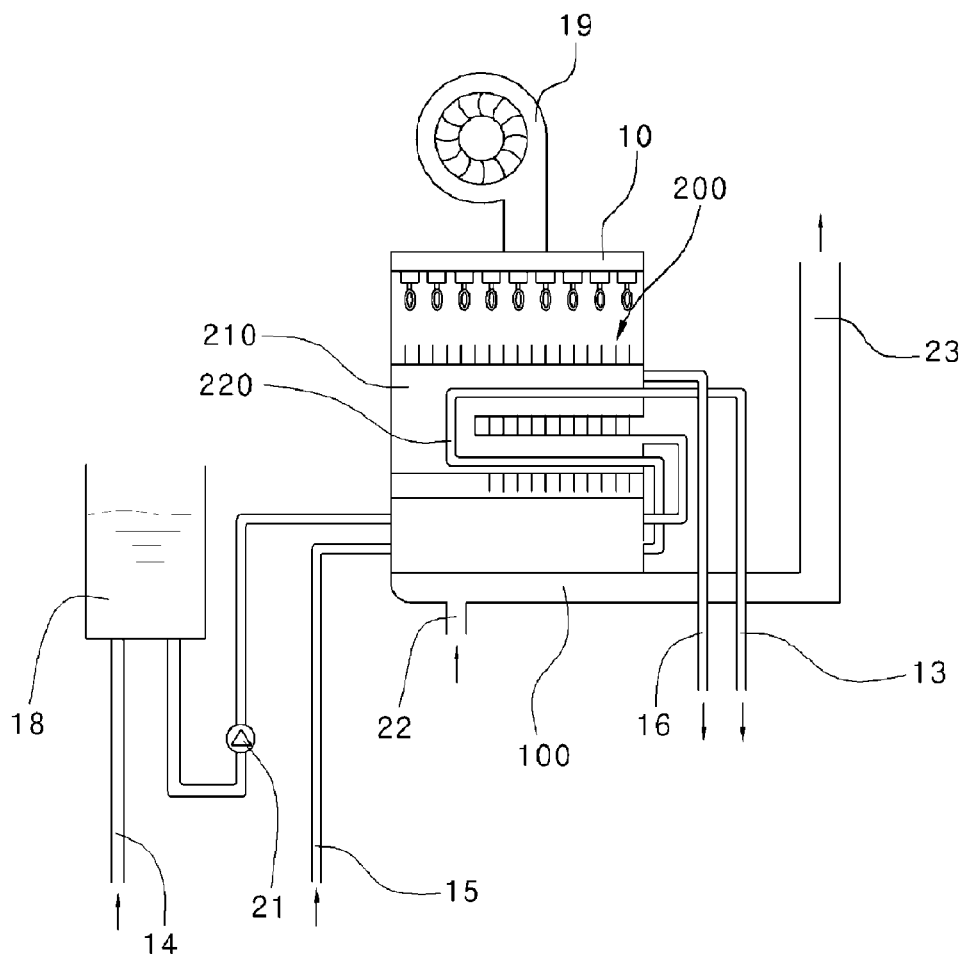

HEAT EXCHANGER OF CONDENSING BOILER FOR HEATING AND HOT-WATER SUPPLY

TECHNICAL FIELD

The present invention relates to a heat exchanger of a condensing boiler for supplying both heating water and hot water, and more particularly to a heat exchanger of a condensing boiler for supplying both heating water and hot water, which can use a double pipe as a sensible heat exchanger instead of using of an indirect heat exchanger in order to heat water in the condensing boiler, thereby allowing a simple structure and a high heat efficiency.

BACKGROUND ART

Boilers mainly used for supplying heating water and hot water at home can be classified into general boilers and condensing boilers according to a method of recovering combustion heat for heating water. The condensing boilers recover latent heat of water vapor involved in exhaust gas and are provided with a separate heat exchanger (latent heat exchanger) to recover latent heat.

Such a latent heat exchanger firstly absorbs combustion heat of a burner, and secondly makes contact with exhaust gas which comes into contact with a sensible heat exchanger exchanging heat with water in an inner pipe so as to have a lowered temperature. As the latent heat exchanger makes contact with relatively low temperature of the exhaust gas, condensed water is generated. Hence, the latent heat exchanger is preferably made of a material, for example, stainless steel or aluminum, etc., to resist corrosion caused by the condensed water (representing acidity due to nitrogen oxide included in the exhaust gas).

FIG. 1 is a view showing a configuration of a conventional downstream-type condensing boiler. As shown in FIG. 1, the condensing boiler for supplying heating water and hot water includes a sensible heat exchanger 11 and latent heat exchanger 12 for absorbing combustion heat of a burner 10 in order to exchange heat with water in an inner pipe, which are made of a single pipe. Both ends of the sensible and latent heat exchangers 11 and 12 are connected to a heating water supplying port 13 and a heating water returning port 14 of the heating pipe arrangement, respectively. Further, the condensing boiler is provided with an indirect heat exchanger 17 disposed between the heat water supplying port 13 and the heat water returning port 14, which transfers heat energy absorbed by heating water supplied through the heating water supplying port 13 to cold water introduced into a cold water pipe 15, so as to heat the cold water and supply the heated water, i.e. hot water, to a hot water pipe 16.

A reference numeral 18, as not described above, indicates an expansion tank for removing air created in the heating water pipe, decreasing pressure caused by the expansion of heating water in the pipe according to an increase of a temperature of heating water, and constantly maintaining the amount of water in the boiler. A reference numeral 19 denotes a blower for supplying combustion heat of the burner 10 to the sensible heat exchanger 11 and the latent heat exchanger 12. A reference numeral 20 indicates a three-way valve, a reference numeral 21 indicates a circulation pump, a reference numeral 22 denotes a condensed water drain, and a reference numeral 23 indicates an exhaust port.

In such a boiler, a three-way valve 20 is essentially installed in order to switch the flow of heating water supplied from the heating water supplying port 13 to the heating water pipe to the indirect heat exchanger 17, so that the boiler has a closed circuit for the heating water. Hence, there is a problem in that the boiler has a complicated structure.

Further, since the conventional sensible and latent heat exchangers are made from a single pipe, there is another problem in that a double pipe heat exchanger for supplying heating water and hot water cannot be used as a sensible heat exchanger in the condensing boiler.

DISCLOSURE OF INVENTION

Technical Problem

Accordingly, the present invention has been made to solve the above-mentioned problems occurring in the prior art, and it is an object of the present invention to provide a heat exchanger of a condensing boiler for supplying both heating water and hot water, which can be provided with a latent heat exchanger for preheating and supplying cold water to a sensible heat exchanger, instead of a separate indirect-heat exchanger, in order to heat hot water in the condensing boiler, and to use a double pipe heat exchanger in the sensible heat exchanger so that the heat exchanger has a simple structure and reduced volume.

Technical Solution

In order to accomplish the object of the present invention, according to an embodiment of the present invention, there is provided a heat exchanger of a condensing boiler for supplying both heating water and hot water, which includes: a sensible heat exchanger; and a latent heat exchanger including a heating water heat exchanger and a hot water heat exchanger, the heating water heat exchanger having an inlet portion with one inlet and lots of outlets, an outlet portion with lots of inlets and one outlet, and a plurality of heating water heat exchanging pipes which are connected to inlets and outlets of inlet and outlet portions and arranged in parallel, the hot water heat exchanger having a plurality of hot water heat exchangers which are arranged adjacent to the heating water heat exchangers, respectively, an inlet portion which has one inlet and lots of outlets and is connected to a hot water inlet port of the hot water heat exchanger, and an outlet portion which has lots of inlets and one outlet and is connected to a hot water outlet port of the hot water heat exchanger, wherein the outlet portion of the heating water heat exchanger is connected to a heating water port of the sensible heat exchanger, and the outlet portion of the hot water heat exchanger is connected to a hot water port of the sensible heat exchanger.

In order to accomplish the object of the present invention, according to another embodiment of the present invention, there is provided a heat exchanger of a condensing boiler for supplying both heating water and hot water, which includes: a sensible heat exchanger; and a latent heat exchanger made by connecting a plurality of unit heat exchangers to define exhaust gas pathway, each unit heat exchanger being manufactured in such a manner that three plates having a convexo-concave shape are stacked on one another to define a heating water pathway and a hot water pathway to be adjacent to each other in order to increase a heat transfer area.

The sensible heat exchanger includes a double pipe heat exchanger manufactured in such a manner that a heating water heat exchanging pipe is inserted into a hot water heat exchanging pipe, or that the hot water heat exchanging pipe is inserted into the heating water heat exchanging pipe.

Advantageous Effects

As described above, the condensing boiler of the present invention is provided with a double pipe heat exchanger as a sensible heat exchanger, which includes an outer pipe for hot water and an inner pipe for heating water, or includes an outer pipe for heating water and an inner pipe for hot water, so as to preheat cold water using latent heat. Further, since a separate hot water heat exchanger is not required to heat hot water, the condensing boiler has a simple structure and reduced volume.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a view showing a configuration of a conventional condensing boiler;

FIG. 2 is a view showing a configuration of a latent heat exchanger according to the present invention, which is shown for a purpose of illustrating a basic principle;

FIGS. 3 to 5 are views showing a configuration of a latent heat exchanger provided with a hot water heat exchanger according to the present invention; and FIG. 6 is a view showing a configuration of a condensing boiler using a latent heat exchanger in which a hot water heat exchanger and a heating water heat exchanger are integrally formed, according to the present invention.

BEST MODE FOR CARRYING OUT THE INVENTION

Hereinafter, the preferred embodiment of the present invention will be described in detail with reference to the accompanying drawings.

FIG. 2 is a view showing a configuration of a latent heat exchanger according to the present invention, which is shown for a purpose of illustrating a basic principle.

As shown in FIG. 2 attached hereto, a heating water heat exchanger 30 (represented by a thick solid line) includes an inlet portion 32 connected to a heating water returning port through which heating water is returned from a heating water pipe (not shown), a heating water heat exchanging pipe 33 for exchanging heat with exhaust gas of a burner, and an outlet portion 34 through which heating water absorbing latent heat from the exhaust gas is supplied to a sensible heat exchanger 200.

The inlet portion 32 of the heating water heat exchanger 30 has a structure in which water is introduced into a single pipe and is output to multiple pipes (the heating water exchanging pipe 33). The outlet portion 34 of the heating water heat exchanger 30 has a structure in which water is input from multiple pipes (the heating water heat exchanging pipe 33) and is discharged through a single pipe. A plurality of heating water heat exchanging pipe 33 extends between the inlet portion 32 with a multiple-output structure and the outlet portion 34 with a multiple-input structure.

Therefore, in the heating water heat exchanger 30, heating water introduced through the heating water returning port 31 branches in the multiple heating water heat exchanging pipes 33, and absorbs latent heat of exhaust gas from the respective heating water heat exchanging pipes 33. Then, heating water is collected in the outlet portion 34 and is supplied to the sensible heat exchanger 200.

Meanwhile, exhaust gas pathways 50 are defined among the multiple heating water heat exchanging pipes 33, through which exhaust gas passes and makes contact with the heating water heat exchanging pipes 33 to exchange heat with the pipes.

The heating water heat exchanging pipes 33 straightly extend in parallel between the inlet portion 32 and the outlet portion 34, but its structure is not limited to that mentioned above. Further, in order to manufacture a heat exchanger including the heating water heat exchanging pipe 33 having an increasing heat exchanging area and reduced volume, a bundle of pipes are connected by zig-zag to one another using U-shaped pipes. Thus, the heat exchanger having a hexagonal appearance may be manufactured. Alternatively, the heat exchanger may be manufactured by using a cover having a fluid pathway connecting the heat exchanging pipes instead of the U-shaped pipes.

In addition, the hot water heat exchanger 40 (represented by a thin solid line) is mounted on the heat exchanger and has the hot water heat exchanging pipes 43, each of which is arranged adjacent to each heating water heat exchanging pipe 33 of the heating water heat exchanger 30. Preferably, the hot water heat exchanging pipes 43 are arranged in a row in order to increase the heat exchanging area. Each hot water exchanging pipe 43 includes an inlet portion 42 at a hot water inlet and an outlet portion 44 at a hot water outlet, similar to the heating water heat exchanging pipe 33.

Accordingly, cold water introduced into the cold water inlet port 41 is branched at the inlet portion into a plurality of hot water heat exchanging pipes 43 and absorbs latent heat of the exhaust gas through each hot water heating exchanging pipe 43. Then, cold water is collected in the outlet portion 44 and supplied to the sensible heat exchanger 200 as described below.

As described above, the latent heat exchanger 100 according to the present invention includes the heating water heat exchanger 30 and the hot water heat exchanger 40, which are integrated with each other, and absorbs latent heat of the exhaust gas. A relatively low temperature of heating water and cold water, which are introduced into the latent heat exchanger 100 through the heating water returning port 31 and the cold water inlet port 41, are firstly heated by the heating water heat exchanger 30 and the hot water heat exchanger 40 and then are supplied to the latent heat exchanger 200.

In this embodiment, although a heat exchanger having a basic structure of including a plurality of heat exchanging pipes has been described as an example of the latent heat exchanger 100, the present invention can be applied to a heat exchanger having a structure in that three plates 51, 52 and 53 having a convexo-concave shape are stacked on one another, and a heating water fluid pathway 54 and a hot water pathway 55 are formed between the stacked plates 51, 52 and 53, so that a unit heat exchanger 50 is established, while the unit heat exchangers 50 which have exhaust gas pathways 56 defined therebetween are stacked on one another, as described below with reference to FIGS. 3 to 5.

FIGS. 3 to 5 are views showing a configuration of the latent heat exchanger including the hot water heat exchanger and the heating water heat exchanger according to another embodiment of the present invention.

In the embodiment shown in FIGS. 3 to 5, a unit heat exchanger 50 is made in such a manner that the plates 51 and 53 are stacked on both sides of a plate 52, and the heating water pathways 54 and the hot water pathway 55 are formed in parallel between the plates 51, 52 and 53. Then, a plurality of unit heat exchangers 50 are connected to one another in series so as to define exhaust gas pathways 56 therebetween, so that the latent heat exchanger can be established in which the heating water pathways 54 and the hot water pathways 55 are alternately arranged.

As shown in FIG. 4, the unit heat exchanger 50 is basically manufactured in such a manner that the stainless plates 51, 52 and 53 having the convexo-concave shape are stacked on one another and brazed. The convexo-concave portions of the plates 51, 52 and 53 increase a heat transfer area within a predetermined volume to improve heat transfer efficiency, and in addition prevent the plates 51, 52 and 53 from being deformed and damaged due to the expansion of heated water in the heat exchanger.

Further, three plates 51, 52 and 53 constituting a unit heat exchanger 50 respectively have an inlet 32 and outlet 34 for heating water, and an inlet 42 and outlet 44 for hot water, which are formed therein. The hot water inlet 42 of the intermediate plate 52 is welded to the hot water outlet 44 of the plate 53 so as to form the hot water pathway 54. Similarly, the heating water inlet 32 of the intermediate plate 52 is welded to the heating water outlet 34 so as to form the heating water pathway 55. Accordingly, when a plurality of unit heat exchangers 50 are stacked on one another, the heating water pathways 54 of the unit heat exchangers 50 are communicated with one another, and similarly the hot water pathways 55 of the unit heat exchangers 50 are communicated with one another, thereby establishing the heat exchanger having the inlet portion and outlet portion.

Of course, brazing the unit heat exchangers is generally accomplished in a stainless brazing furnace. When three plates 51, 52 and 53 are brazed, two fluid pathways are defined by means of two plates 51 and 53 attached to the intermediate plate 52. One fluid pathway is used as the heating water pathway 54 through which the heating water passes, and the other is used as the hot water pathway 55 through which the hot water passes.

Several unit heat exchangers 50 are stacked and brazed on one another according to necessary capacity. When the unit heat exchangers 50 are stacked, the convexoconcave portions of the adjacent plates 51 define the exhaust gas pathway 56 (represented by a thick arrow), through which the exhaust gas generated by combustion passes, between the adjacent unit heat exchangers 50. Of course, the unit heat exchangers 50 may be stacked and brazed at a time, so as to form the heat exchanger.

As shown in FIG. 3, the heating water introduced into the heating water inlet portion 32 is discharged to the heating water outlet portion 34 through the heating water pathway 54 of each unit heat exchanger 50. Also, cold water introduced into the hot water inlet 42 is discharged to the hot water outlet portion 34 through the hot water pathway 55 of each unit heat exchanger 50. While passing through the exhaust gas pathway 56 between the unit heat exchangers 50, the exhaust gas transfers heat to the heating water and hot water in the heating water pathway 54 and the hot water pathway 55.

When heating rooms is carried out, the heating water has increasing heat absorbing capability. Hence, heat energy absorbed by the hot water pathway 55 is transferred to the heating water pathway 54 through the intermediate plate 52. On the other hand, when hot water is used, the hot water has increasing heat absorbing capability. Therefore, heat energy absorbed by the heating water pathway 54 is transferred to the hot water pathway 55 through the intermediate plate 52.

Through the above-mentioned procedure, the latent heat exchanger 100 of the present invention has maximum heat absorbing capability when rooms are heated and hot water is used. Hence, the use of a separate indirect-heat exchanger for hot water is unnecessary.

FIG. 6 is a view showing a configuration of a condensing boiler using a latent heat exchanger in which a hot water heat exchanger and a heating water heat exchanger are integrally formed, according to the present invention.

As shown in FIG. 6 attached hereto, in a condensing boiler provided with a downstream combustion heat exchanger, a blower 19 is disposed on an upper end of the boiler, and a burner 10, a sensible heat exchanger 200 and a latent heat exchanger 100 are sequentially disposed under the blower 19.

Specifically, a double pipe heat exchanger having an outer pipe for a hot water pathway 210 and an inner pipe for a heating water pathway 220 is used as the sensible heat exchanger 200 in the condensing boiler. However, the sensible heat exchanger 200 is not limited to the double pipe exchanger. The sensible heat exchanger 200 may have an outer pipe for a heating water pathway and an inner pipe for a hot water pathway, and also can be applied to a double pipe heat exchanger which circulates heating water within the boiler using a three-way valve, instead of circulating heating water within heating pipe in a room, when hot water is used.

In the condensing boiler of the present invention constructed as described above, combustion heat generated by the burner 10 makes direct contact with hot water in the sensible heat exchanger 200 to transfer heat to hot water so as to heat hot water which in turn indirectly heats heating water.

The latent heat exchanger 100 preheats heating water returned from the heating pipes in the rooms and cold water introduced from the cold water pipe 15 using latent heat of exhaust gas passing through the sensible heat exchanger 200.

The exhaust gas passing through the latent heat exchanger 100 is discharged outside through the exhaust port 23. Condensed water generated in a heat transferring procedure is collected in a drain 22 and then is discharged outside.

Further, the circulation pump 21 is disposed on a portion of a heating pipe line to circulate the heating water. When the circulation pump 21 operates, the heating water finished heating rooms is introduced into the boiler through the heating water returning port 14 and flows to the expansion tank 18 in order to regulate its pressure. Next, the heating water absorbs heat energy through a heat transfer procedure in the latent heat exchanger 100 and the sensible heat exchanger 200, and is supplied to the heating pipe line in the rooms, thereby heating the rooms. The procedure of heating rooms is repeatedly performed.

As described above, the present invention preheats the heating water and hot water using latent heat of exhaust gas in the latent heat exchanger 100 and enables the heating water and the hot water to absorb latent heat in the latent heat exchanger. Therefore, a double pipe heat exchanger in which a hot water pathway and a heating water pathway are formed dually can be used as the sensible heat exchanger.

Industrial Applicability

As described above, the present invention can use a double pipe heat exchanger as a sensible heat exchanger, thereby preheating cold water using latent heat in a condensing boiler.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A heat exchanger of a condensing boiler for supplying both heating water and hot water, the heat exchanger comprising:
　　a sensible heat exchanger including a double pipe heat exchanger manufactured in such a manner that a heating water heat exchanging pipe is inserted into a hot water heat exchanging pipe, or that the hot water heat exchanging pipe is inserted into the heating water heat exchanging pipe; and
　　a latent heat exchanger including a heating water heat exchanger and a hot water heat exchanger, the heating water heat exchanger having an inlet portion with one inlet and a plurality of outlets, an outlet portion with a plurality of inlets and one outlet, and a plurality of heating water heat exchanging pipes which are connected to the inlets and outlets of the inlet and outlet portions and arranged in parallel, the hot water heat exchanger having a plurality of hot water heat exchanging pipes which are arranged adjacent to the heating water heat exchanging pipes, respectively, an inlet portion which has one inlet and a plurality of outlets and is connected to a hot water inlet port of the hot water heat exchanger, and an outlet portion which has a plurality of inlets and one outlet and is connected to a hot water outlet port of the hot water heat exchanger, wherein the outlet portion of the heating water heat exchanger is connected to a heating water port of the sensible heat exchanger, and the outlet portion of the hot water heat exchanger is connected to a hot water port of the sensible heat exchanger.

2. A heat exchanger of a condensing boiler for supplying both heating water and hot water, comprising:

a sensible heat exchanger including a double pipe heat exchanger manufactured in such a manner that a heating water heat exchanging pipe is inserted into a hot water heat exchanging pipe, or that the hot water heat exchanging pipe is inserted into the heating water heat exchanging pipe, and a latent heat exchanger, wherein the latent heat exchanger is made by connecting a plurality of unit heat exchangers to define an exhaust gas pathway, each unit heat exchanger being manufactured in such a manner that three plates having a convexo-concave shape are stacked on one another to define a heating water pathway and a hot water pathway to be adjacent to each other in order to increase a heat transfer area, wherein an outlet portion of the heating water pathway is connected to a heating water port of the sensible heat exchanger, and an outlet portion of the hot water pathway is connected to a hot water port of the sensible heat exchanger.

3. The heat exchanger of the condensing boiler as claimed in claim 2, wherein each of three plates constituting the unit heat exchanger has heating water inlet and outlet portions and hot water inlet and outlet portions formed the plate, wherein peripheral portions of the hot water inlet and outlet portions of an intermediate plate and outer plates defining the heating water pathway are welded to each other, and wherein when the plurality of unit heat exchangers is stacked, the heating water pathways of the unit heat exchangers are communicated with one another and similarly the hot water pathways of the unit heat exchangers are communicated with one another, so that the heat exchanger has an inlet portion with one inlet and lots of outlets and an outlet portion with lots of inlets and one outlet.

* * * * *